United States Patent
Barone

(10) Patent No.: US 8,179,399 B2
(45) Date of Patent: May 15, 2012

(54) RASTERIZING METHOD

(75) Inventor: Massimiliano Barone, Bresso (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1130 days.

(21) Appl. No.: 12/029,357

(22) Filed: Feb. 11, 2008

(65) Prior Publication Data
US 2009/0201307 A1   Aug. 13, 2009

(51) Int. Cl.
*G09G 5/00* (2006.01)

(52) U.S. Cl. .................................. 345/581

(58) Field of Classification Search ............. 345/581
See application file for complete search history.

(56) References Cited

U.S. PATENT DOCUMENTS

| | | | |
|---|---|---|---|
| 2004/0075655 A1* | 4/2004 | Dunnett | 345/418 |
| 2004/0145589 A1* | 7/2004 | Prokopenko et al. | 345/581 |
| 2009/0046098 A1 | 2/2009 | Barone et al. | 345/420 |
| 2009/0147016 A1 | 6/2009 | Barone et al. | 345/581 |

OTHER PUBLICATIONS

Watt, "Fundamentals of Three-dimensional Computer Graphics," Addison-Wesley Publishing Company, Reading, Mass., 1991, pp. 97-113.

* cited by examiner

*Primary Examiner* — Jeffrey Chow
(74) *Attorney, Agent, or Firm* — Seed IP Law Group PLLC

(57) ABSTRACT

A rasterizing method calculates an attribute (C) of a pixel having coordinates (X, Y) based on the coordinates $(X_0, Y_0)$, $(X_1, Y_1)$, $(X_2, Y_2)$ of vertices of a primitive in a screen space, Z coordinates $Z_0$, $Z_1$ and $Z_2$ of said vertices into the three-dimensional space, and attributes $C_0$, $C_1$, $C_2$ of said vertices. The method defines a vertex $(X_0, Y_0)$ as reference, the attribute (C) with the formula:

$$C = \frac{\begin{array}{l}(\Delta X_{20}\Delta Y_{10} - \Delta Y_{20}\Delta X_{10})Z_1 Z_2 C_0 + \\ (\Delta y \Delta X_{20} - \Delta x \Delta Y_{20})(Z_0 Z_2 C_1 - Z_1 Z_2 C_0) + \\ (\Delta x \Delta Y_{10} - \Delta y \Delta X_{10})(Z_0 Z_1 C_2 - Z_1 Z_2 C_0)\end{array}}{\begin{array}{l}(\Delta X_{20}\Delta Y_{10} - \Delta Y_{20}\Delta X_{10})Z_1 Z_2 + \\ (\Delta y \Delta X_{20} - \Delta x \Delta Y_{20})(Z_0 Z_2 - Z_1 Z_2) + \\ (\Delta x \Delta Y_{10} - \Delta y \Delta X_{10})(Z_0 Z_1 - Z_1 Z_2).\end{array}}$$

26 Claims, 7 Drawing Sheets

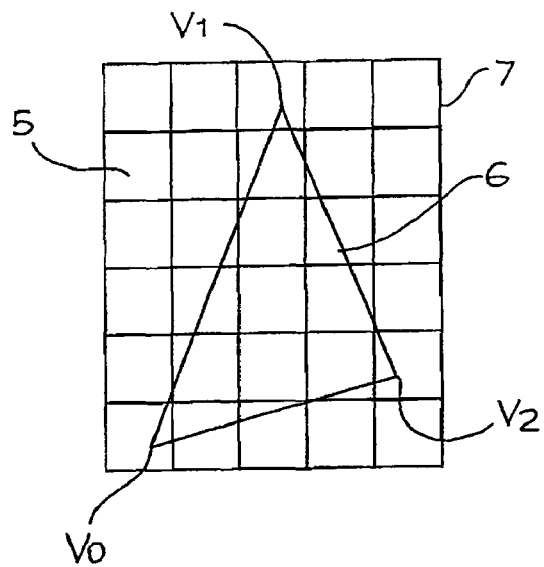
*Fig.6*
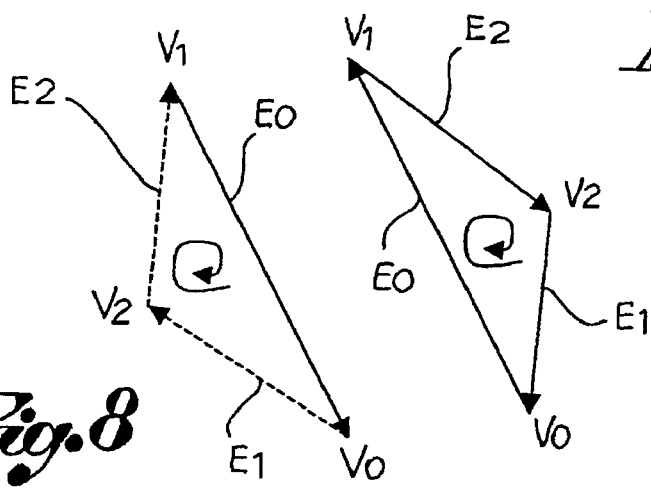
*Fig.7*
*Fig.8*
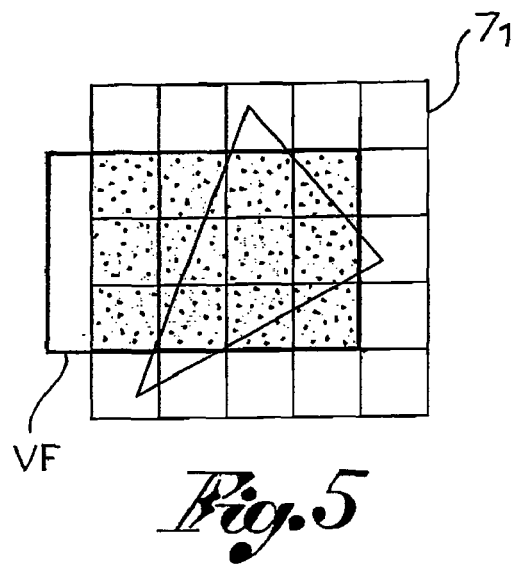
*Fig.5*

RASTERIZING METHOD

BACKGROUND

1. Technical Field

The present invention relates to the technical field of graphic rendering and, in particular, to a rasterizing method for finding and rendering all the pixels of the screen associated with a primitive.

2. Description of the Related Art

A virtual three dimensional (3D) model (or simply "3D model") is comprised of primitives in the form of polygons, such as triangles, which represent the skin of the 3D model. A graphic 3D engine draws polygons from the 3D model onto a two-dimensional (2D) surface, such as a screen.

A summary of the prior art rendering process can be found in: "Fundamentals of Three-Dimensional Computer Graphics", by Watt, Chapter 5: The Rendering Process, pages 97 to 113, published by Addison-Wesley Publishing Company, Reading, Mass., 1989, reprinted 1991, ISBN 0-201-15442-0.

In a traditional pipeline, the primitives are processed in a submission order. A more efficient method is to break up the frame buffer into individual subsections (tiles) and to render them individually. Each tile includes one or more polygons or, more typically, a portion of one or more polygons.

A tile based rendering employs therefore a way to associate tiles covered by a primitive. A rasterizer renders all primitives of one tile, so which tile is covered by that primitive is found first.

To reduce the amount of tiles that each polygon is assigned to, a primitive or polygon binning method may be used. A polygon binning method excludes tiles that do not include any polygons or portions thereof prior to rasterization. The binning process also accomplishes some rasterization setup by identifying which polygons are contained by each tile.

The rasterizing process comprises receiving the vertices of a primitive, finding all the pixels associated with the primitive, and rendering all the pixels. Rendering implies associating with each pixel a set of attributes. The attributes are data (color, coordinates position, texture coordinate etc.) associated with a primitive. Starting from the attributes of the vertices of a primitive, the rasterizer finds the attributes of each pixel by interpolation.

Some kinds of rasterizers are already known.

One of the most used rasterizers is known as Bresenham. Starting from a triangle vertex, it uses an incremental technique which finds border pixels using the Bresenham scan line.

Another approach is known as RLI. Also this method always starts from a triangle vertex and uses another scan line technique to find border pixels.

This is an incremental technique that reduces the possibility to have a high parallelism. It calculates all attributes using deltax, deltay, deltaz coordinates of the current pixels. The calculation attribute is incremental, so it saves a lot of operations compared to the Bresenham. However, the rendering direction is not flexible.

A further approach is known as Homogeneus, because all calculations are performed into homogeneous space (defined by x, y, z, w coordinates). It does not use a scan line technique to find border pixels but it makes a test location based on an edge equation. It can start from any point for rendering, and it can calculate all attributes using deltax, deltay, deltaz coordinates of the current pixel. However, since all calculations are made into homogeneous space, this technique requires more computation then RLI.

There is therefore the need of rendering pixels in a more efficient way, in order to reduce the amount of processing to be performed by the 3D graphic engine.

BRIEF SUMMARY

One embodiment of the present invention provides a rasterizing method, comprising:

calculating an attribute (C) of a pixel having coordinates $(X, Y)$, knowing the coordinates $(X_0, Y_0), (X_1, Y_1), (X_2, Y_2)$ of the vertices of a primitive into screen space, the Z coordinates $Z_0, Z_1$ and $Z_2$ of said vertices into the three-dimensional space, and attributes $C_0, C_1, C_2$ of said vertices, the calculating including:

defining a vertex $(X_0, Y_0)$ as reference, finding H coefficients $H_0 = (\Delta X_{20}\Delta Y_{10} - \Delta Y_{20}\Delta X_{10})Z_1Z_2C_0$ $H_1 = -\Delta Y_{20}(Z_0Z_2C_1 - Z_1Z_2C_0) + \Delta Y_{10}(Z_0Z_1C_2 - Z_1Z_2C_0)$ $H_2 = \Delta X_{20}(Z_0Z_2C_1 - Z_1Z_2C_0) - \Delta X_{10}(Z_0Z_1C_2 - Z_1Z_2C_0)$ $H_3 = (\Delta X_{20}\Delta Y_{10} - \Delta Y_{20}\Delta X_{10})Z_1Z_2$ $H_4 = -\Delta Y_{20}(Z_0Z_2 - Z_1Z_2) + \Delta Y_{10}(Z_0Z_1 - Z_1Z_2)$ $H_5 = \Delta X_{20}(Z_0Z_2 - Z_1Z_2) - \Delta X_{10}(Z_0Z_1 - Z_1Z_2)$ wherein $\Delta X_{ij} = X_i - X_j$ and $\Delta Y_{ij} = Y_i - Y_j$, calculating attribute C using the formula:

$$c = \frac{H_0 + H_1\Delta x + H_2\Delta y}{H_3 + H_4\Delta x + H_5\Delta y}$$

wherein $\Delta x = X - X_0$ and $\Delta y = Y - Y_0$.

BRIEF DESCRIPTION OF THE SEVERAL VIEWS OF THE DRAWINGS

The features and advantages of the method according to various embodiment of the invention will be apparent from the description given below, with reference to the following figures, in which:

FIG. 5 shows an intersection between a frustum and the screen;

FIG. 6 represents a bounding box around a triangle according to one embodiment of the invention;

FIGS. 7 and 8 schematically illustrate the step of determining the coefficients sign of the edge equations according to one embodiment;

DETAILED DESCRIPTION

Figure 1:
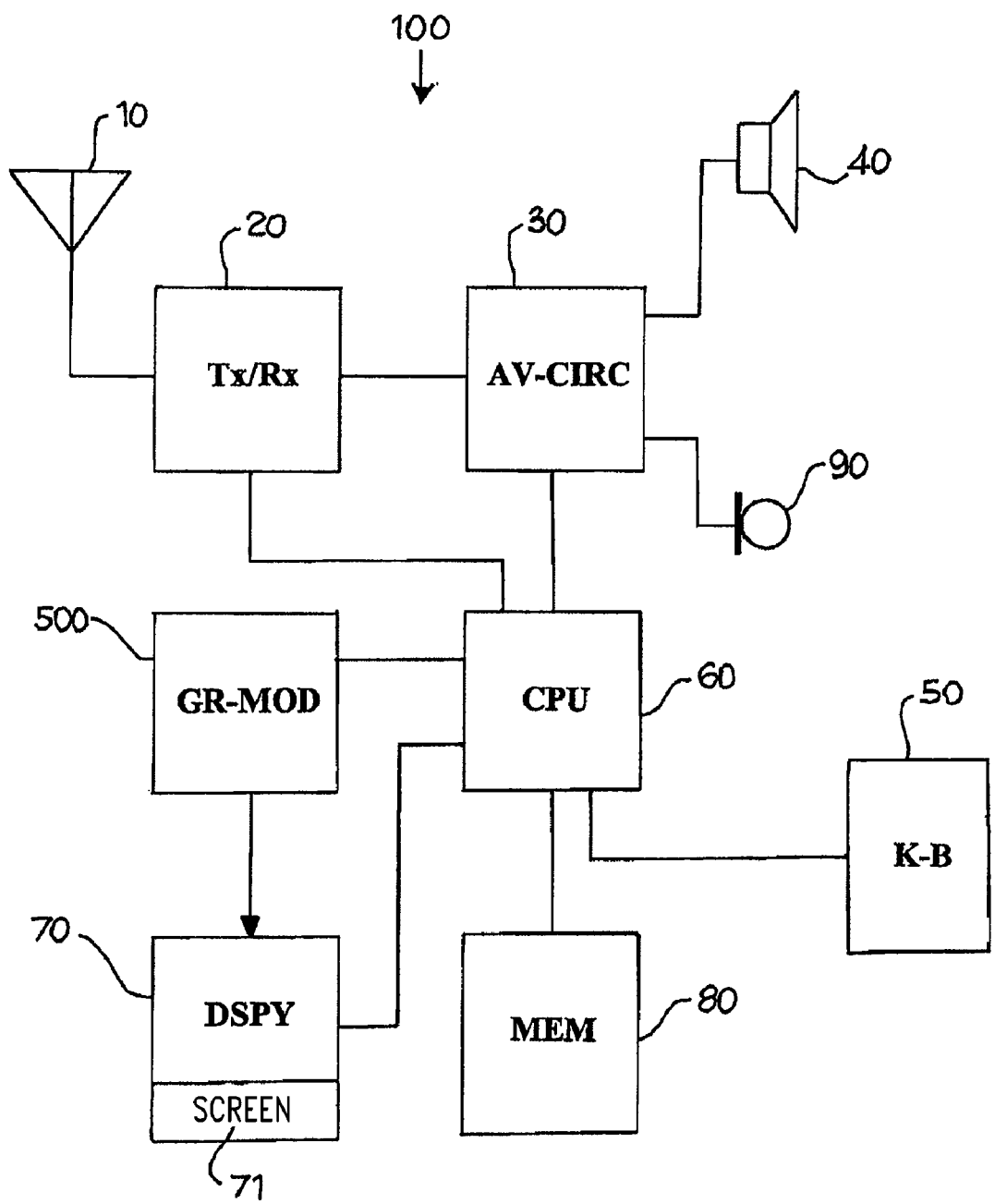
FIG. 1 shows a graphic system in accordance with one embodiment of the invention.

FIG. 1 shows a graphic system according to an embodiment of the invention and comprising a graphic module 500

(GR-MOD). The graphic system 100 illustrated in FIG. 1 is a mobile phone, but in accordance with further embodiments of the invention, graphic system 100 can be another system such as a personal digital assistant (PDA), a computer (e.g., a personal computer), a game console (e.g., PlayStation), etc.

As an example, the mobile phone 100 can be a cellular phone provided with an antenna 10, a transceiver 20 (Tx/Rx) connected with the antenna 10, an audio circuit unit 30 (AV-CIRC) connected with the transceiver 20. A speaker 40 and a microphone 90 are connected with the audio circuit unit 30.

The mobile phone 100 is further provided with a CPU (Central Processing Unit) 60 for controlling various functions and, particularly, the operation of the transceiver 20 and the audio circuit unit 30 according to a control program stored in a system memory 80 (MEM), connected to the CPU 60. Graphic module 500 is coupled to and controlled by the CPU 60. Moreover, mobile phone 100 is provided with a display unit 70 provided with a corresponding screen 71 (e.g., a liquid crystal display, DSPY), and a user interface 50, such as an alphanumeric keyboard (K-B).

The graphic module 500 is configured to perform a set of graphic functions to render an image on the screen 71 of the display 70. In one embodiment, the graphic module 500 is a graphic engine configured to render images, offloading the CPU 60 from performing such tasks. In one embodiment of the present invention the term "graphic engine" means a device which performs rendering in hardware. The terms "graphic accelerator", also employed in the field, is equivalent to the term graphic engine.

Alternatively, the graphic module 500 can be a graphic processing unit (GPU) wherein the rendering functions are performed on the basis of hardware and software instructions. In accordance with a further embodiment, some or all of the rendering functions are performed by the CPU 60.

Figure 2:
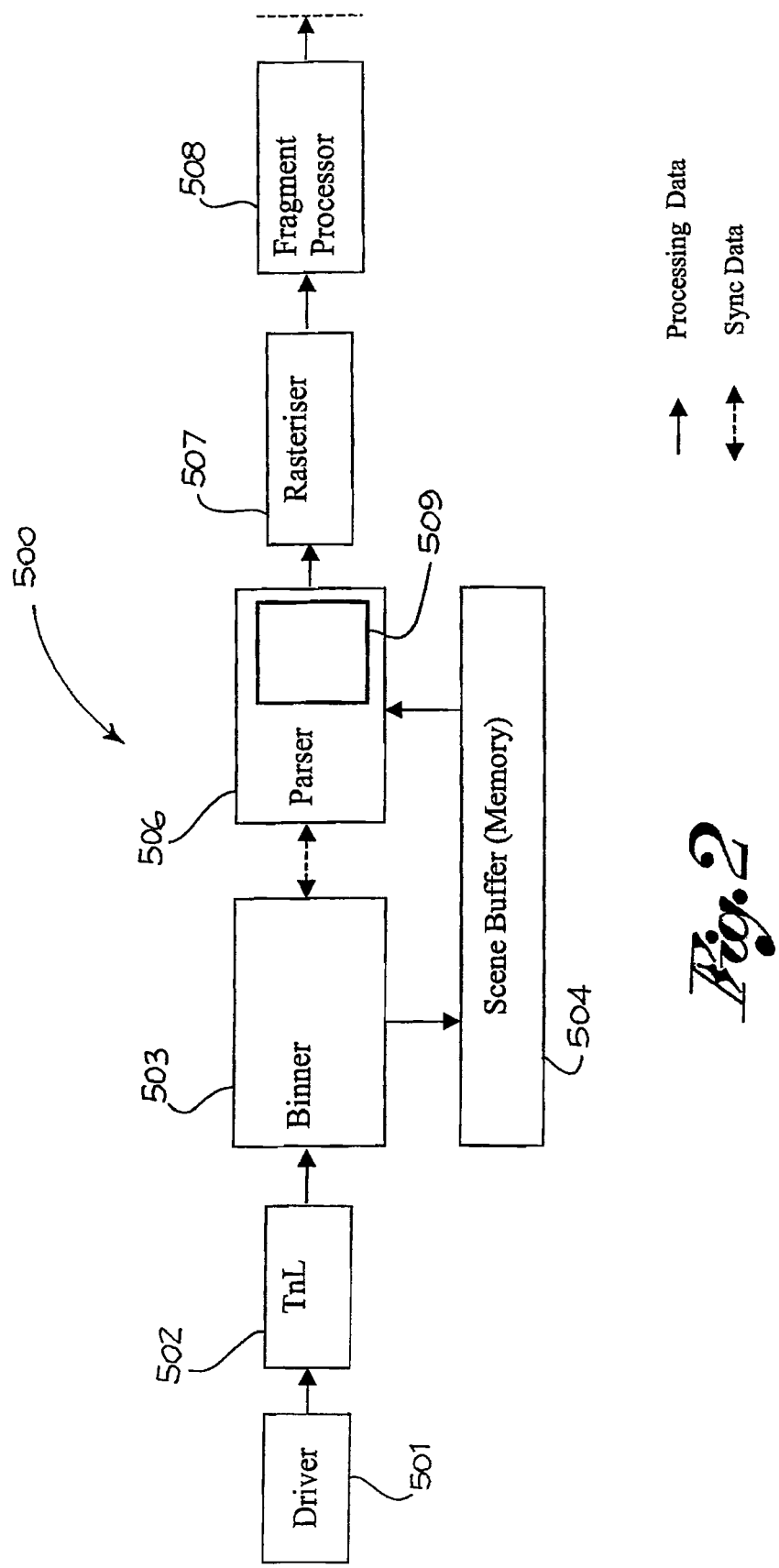
FIG. 2 shows an example of graphic module in accordance with one embodiment of the invention.

In FIG. 2 a diagram of the graphic module 500, is shown by means of functional blocks. Graphic engine 500 can perform the rendering of 3D (three dimensional) scenes that are displayed on the screen 71 of the display 70. According to one embodiment, the graphic engine 500 can operate according to a sort-middle rendering approach (also called "tile based" rendering).

In accordance with the sort-middle rendering, the screen 71 of the display 70 is divided in a plurality of 2D (two dimensional) ordered portions (i.e., 2D tiles) such as, for example, square tiles 5 as shown in FIG. 7. As an example, the screen is divided into 2D tiles having size 16×16 pixels or 64×64 pixels.

The graphic engine 500, illustrated in FIG. 2, comprises a driver 501, a geometry stage 502 (also known as TnL stage—Transform and Lighting stage) a binner stage 503 and a parser stage 506.

The driver 501 is a block having interface tasks and is configured to accept commands from programs (e.g., application protocol interface—API) running on the CPU 60 and then translate them into specialized commands for the other blocks of the graphic engine 500.

The geometry stage 502 is configured to process primitives and apply to them transformations so as to move 3D objects. As defined above, a primitive is a simple geometric entity such as, e.g., a point, a line, a triangle, a square, a polygon or high-order surface. In the following reference will be made to triangles, which can be univocally defined by the coordinates of their vertexes, without other types of employable primitives.

The binner stage 503 is adapted to acquire from the geometry stage 502 primitive coordinates and associate them to each tile of the screen 71. The binner stage 503 is coupled to a scene buffer 504 which is a memory able to store information provided by the binner stage 503. As an example, the scene buffer 504 is a memory external to the graphic module 500 and can be the memory system 80 illustrated in FIG. 1.

The graphic module 500 further includes a parser stage 506, a rasterizer stage 507 and a fragment processor 508 which is coupled to the display 70. The parser stage 506 is responsible for reading, for each tile, the information stored in the scene buffer 504 and passing such information to the following stages also performing a primitive reordering operation.

The parser stage 506 generates an ordered display list which is stored, temporarily, in a parser side memory 509. The parser stage 506 is suitably coupled to the scene buffer memory 504 in order to read its content and is coupled to the binner stage 503 to receive synchronization signals.

According to one embodiment, the parser side memory 509 may be an on-chip memory, which allows a fast processing. As an example, the parser side memory 509 is integrated on the same chip on which the parser stage 506 has been integrated and, e.g., shows a capacity of 8 kB.

The rasterizer stage 507 is configured to perform processing of primitive data received from the parser stage 506 so as to generate pixel information images such as the attribute values of each pixel. The attributes are data (color, coordinates position, texture coordinate etc.) associated with a primitive. As an example, a triangle vertex has the following attributes: color (R, G, B, A), position, coordinates associated to texture (S, T, Q) and Fog. As is known to the skilled person, a texture is an image (e.g., a bitmap image) that could be mapped on the primitive.

The fragment processor 508 defines fragments from the received pixels, by associating a fragment depth (Z coordinate) with pixels and other data and performing suitable tests on the received pixels.

A method for interpolating the attributes of the pixels associated with a primitive in the form of a triangle, given the attributes of its vertices, will be described later.

Figure 3:
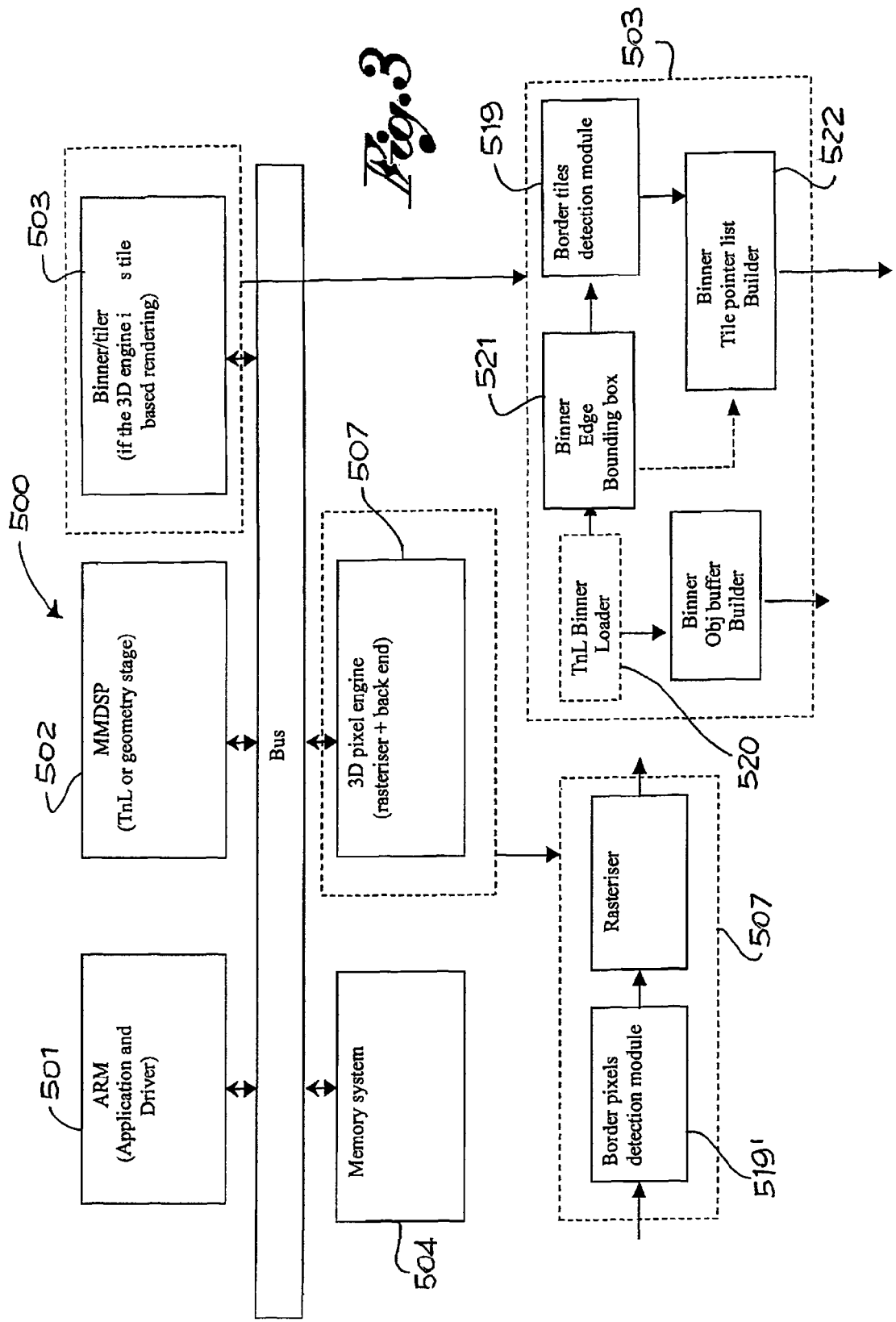
FIG. 3 shows an example of a part of the graphic module in mode detail.

FIG. 3 shows an embodiment of the graphic module 500, wherein the binner module 503 and the rasterizer module 507 are disclosed in more detail. This architectural scheme is developed to work effectively in any 3D hardware (HW) accelerated graphics pipeline. In particular, the module 500 shown in FIG. 3 is oriented towards the integration into the Nomadik Platform (in particular the 8820 version), but it could be easily fitted into any real system that needs an HW accelerated 3D engine. According to one embodiment, binner module 503 includes a border tiles detection module 519 suitable to perform a tiles edge detection process, a geometry stage loader 520, a binner edge bounding box 521, which creates a bounding box around each primitive, and a tile pointer list builder 522. The tile pointer list builder 522 builds the list of commands for each tile. Such commands can be pointers to contexts (for example, fog enable, blending enable, buffer format, etc.) or pointers to primitives that cross the tiles, detected by the corner/edge detection module 519. Afterwards, the graphic engine will read the sequence of commands of each tile, in order to rasterize the scene tile by tile.

According to one embodiment, rasterizer module 507 may include a border pixels detection module 519' suitable to perform a pixels edge detection process, for example according to the method used for the border tiles detection.

Figure 4:
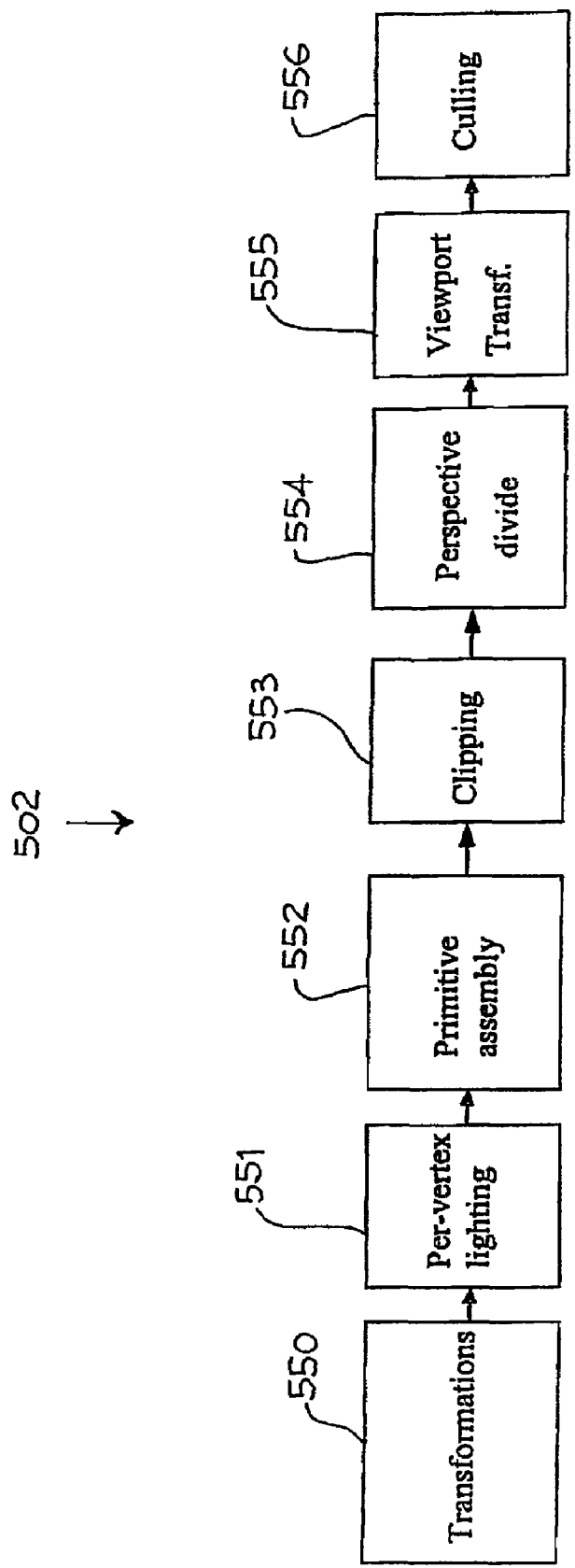
FIG. 4 shows an example of a geometry stage employable in said graphic module.

FIG. 4 shows an embodiment of the geometry stage 502 which includes a transformations stage 550. The transformations stage 550 is configured to apply geometric transformations to vertices of the primitives in each single object of the scene to transform primitives from a user space to a screen space. As an example, transformations are of the affine type and defined in an affine space where two entities are defined: points and vectors. Results of transformation are vectors or points.

Moreover, the particular geometry stage 502 described comprises: a lighting stage 551, a primitive assembly stage 552, a clipping stage 553, a "perspective divide" stage 554, a viewport transformation stage 555 and a culling stage 556.

The per-vertex lighting stage 551 applies light to the primitives depending on a defined light source and suitably adjusts the primitive color vertexes in such a way to define the effect of the light. The primitive assembly stage 552 is a stage that allows reconstruction of the semantic meaning of a primitive so as to specify the primitive type, i.e., specifying if a primitive is a triangle, a line or a point and so on.

The clipping stage 553 allows removal of the primitives that are outside the screen 71 (non-visible primitives) and converting the primitives that are placed partially out of the screen 71 into primitives which are fully visible. The perspective divide stage 554 is adapted to apply a projective transformation dividing each coordinate value by a vector w.

The viewport transformation stage 555 is configured to apply a further coordinates transformation which takes into account the screen resolution. The culling stage 556 has the task of removing the primitives oriented in a direction opposite to the observer and its operation is based on a normal direction associated with each primitive.

In operation, the user of the mobile phone 100 employs the keyboard 50 in order to select a 3D graphic application, such as a video game. As an example, such graphic application allows to show on the screen 71 several scenes. The scenes correspond to what is visible for an observer who can move assuming different positions. Accordingly, a software module corresponding to said graphic application runs on the CPU 60 and activates the graphic module 500.

A 3D scene to be rendered is included in a region of space, called view frustum VF (FIG. 5), which is the observer visible space. In FIG. 5, only a plane portion of the view frustum VF parallel to the screen 71 is shown. The clipping module 503 has the task to find said intersection between the screen 71 and the frustum VF.

According to one embodiment, the binner stage 503 associates empty tiles with the triangle to avoid redundant rasterizer calculations. It is clear that, if triangles are smaller then tiles, the binner stage 503 processes all triangles within each tile before proceeding to the next tile. If the triangles are larger than tiles, it associates the triangles with all the tiles they cross and stores the state. In this case, an exploration of the tiles is carried out.

According to one embodiment, the binner module 503 is adapted to detect the tiles crossed by the edges of a triangle (border tiles). All the tiles between two border tiles on the same row or column are then considered included in the primitive and may therefore be stored.

An example of a method for detecting the border tiles of a primitive defined by at least three vertexes is disclosed in the U.S. patent application Ser. Nos. 11/838,762 and 11/951,186, incorporated herein by reference, in their entirety.

The rasterizer module 507 is the core of a 3D pixel engine. It receives the vertices $V_0=(x_0, y_0)$, $V_1=(x_1, y_1)$ and $V_2=(x_2, y_2)$ of a primitive in the form of a triangle 6 defined by three vertexes. It has to be noted, however, that the rasterizing method here described is also applicable to other polygons, since it is always possible to decompose a polygon in triangles. Moreover, rasterizing module 507 knows the attributes C (for example colors, texture, fog) and the Z coordinate of the vertices.

According to one embodiment, the rasterizing method performed by rasterizing module 507 comprises three phases: a set-up phase, in which all the parameters in common to all the pixels of the same primitive are calculated, a test location phase, in which pixels associated to a primitive are detected (border pixels and internal pixels), and an attributes interpolation phase, in which the attributes of all the pixels detected in the second phase are calculated.

According to one embodiment, the rasterizing module 507 is able to calculate an attribute C from an absolute point of the screen by means of the following formula with perspective correction:

$$C = \frac{\begin{array}{l}(\Delta X_{20}\Delta Y_{10} - \Delta Y_{20}\Delta X_{10})Z_1 Z_2 C_0 + \\ (\Delta y \Delta X_{20} - \Delta x \Delta Y_{20})(Z_0 Z_2 C_1 - Z_1 Z_2 C_0) + \\ (\Delta x \Delta Y_{10} - \Delta y \Delta X_{10})(Z_0 Z_1 C_2 - Z_1 Z_2 C_0)\end{array}}{\begin{array}{l}(\Delta X_{20}\Delta Y_{10} - \Delta Y_{20}\Delta X_{10})Z_1 Z_2 + \\ (\Delta y \Delta X_{20} - \Delta x \Delta Y_{20})(Z_0 Z_2 - Z_1 Z_2) + \\ (\Delta x \Delta Y_{10} - \Delta y \Delta X_{10})(Z_0 Z_1 - Z_1 Z_2)\end{array}}$$

where:

$(X_0,Y_0)$, $(X_1,Y_1)$, and $(X_2,Y_2)$ are the vertices coordinates into screen space;

$Z_0$, $Z_1$, $Z_2$ are Z coordinates into 3d space as z buffer;

$C_0$, $C_1$, $C_2$ are vertex attributes;

(x,y) are coordinates of a point into screen space, and where $\Delta x = X - X_0$ and $\Delta y = Y - Y_0$ are the difference between the generic point of the screen space and a vertex chosen as reference, for example $V_0=(X_0, Y_0)$.

Besides, rasterizer module 507 calculates also the Z coordinate as $$Z = \frac{Z_0 Z_1 Z_2}{\begin{array}{l}(\Delta X_{20}\Delta Y_{10} - \Delta Y_{20}\Delta X_{10})Z_1 Z_2 + \\ (\Delta y \Delta X_{20} - \Delta x \Delta Y_{20})(Z_0 Z_2 - Z_1 Z_2) + \\ (\Delta x \Delta Y_{10} - \Delta y \Delta X_{10})(Z_0 Z_1 - Z_1 Z_2)\end{array}}$$

It should be noted that Z has the same denominator of the previous formula, and that these calculations are carried out only once for the primitive, in the set-up phase.

Now the attribute calculation leading to the previous formulae will be explained starting from the data of the vertices of a triangle.

The attribute calculation is linear into eye space and then becomes not linear into screen space by virtue of the division by the homogeneous coordinate "w".

Figure 9A:
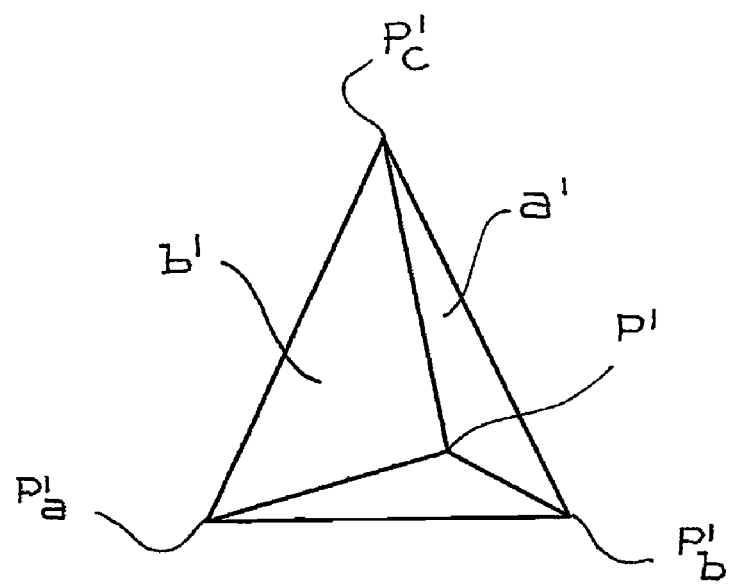
FIGS. 9a and 9b show a triangle in eye space and into screen space, respectively.
Figure 9B:
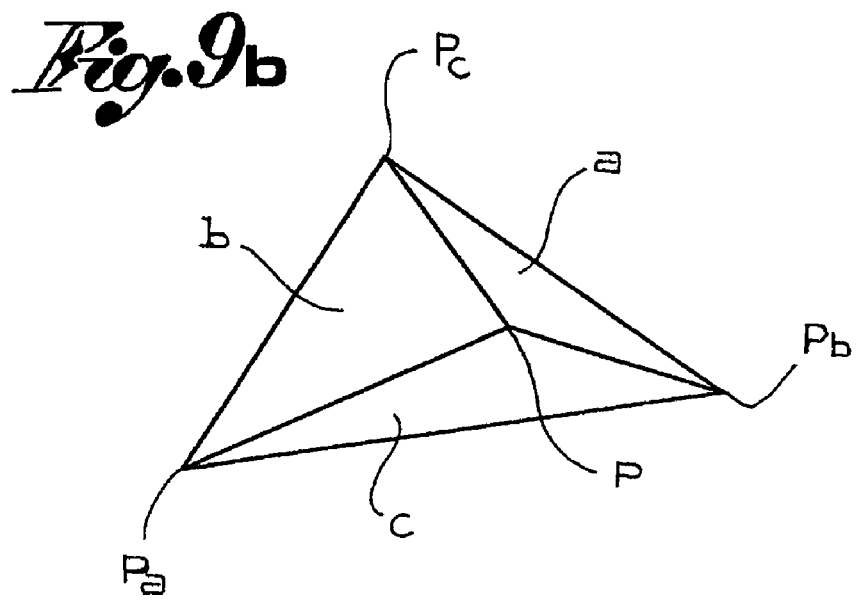
Figure 10A:
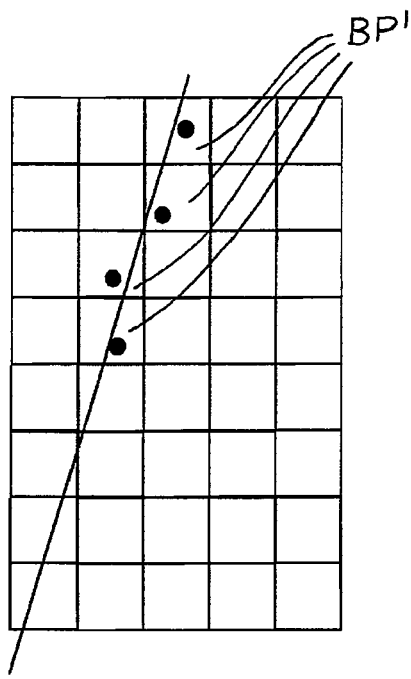
FIGS. 10a-10d schematically shows different steps of a parallel rendering.
Figure 10B:
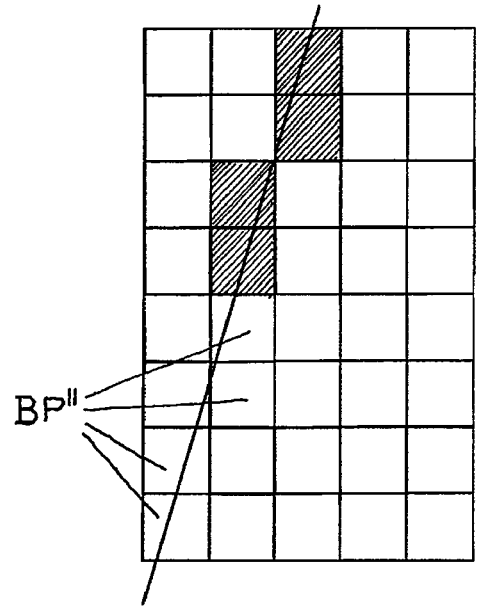
Figure 10C:
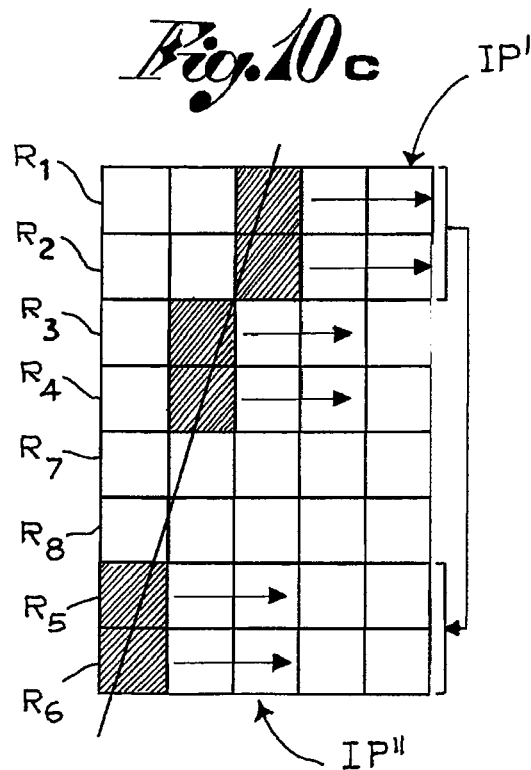
Figure 10D:
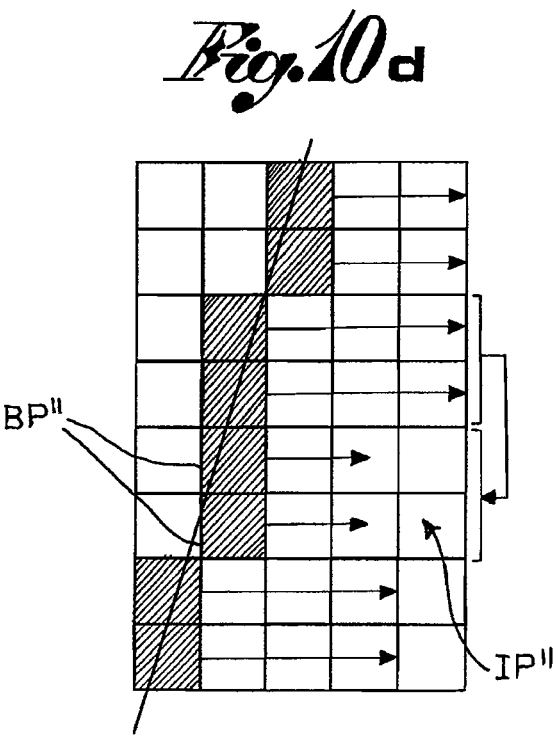

In FIG. 9a it is shown a triangle into eye space having vertices P'a, P'b and P'c. P' is a generic point inside the triangle. In FIG. 9b it is shown the same triangle but into screen space, after perspective transformation. The vertices of this triangle are Pa, Pb and Pc. P is the generic point inside the triangle.

Into eye space a point P' is given by the linear combination of vertices P'a, P'b, P'c:

$$P'=a'*P'a+b'*P'b+c'*P'c,$$

where a', b' and c' are the portions of triangle area built from P' point to triangle edges.

The triangle area is normalized by default, so the value is one. It means that the sum of all areas gives one.

$$1 = a' + b' + c'.$$

The same consideration is valid also for screen space.

Into screen space a point P is given by the linear combination of vertices Pa, Pb, Pc:

$$P = a*Pa + b*Pb + c*Pc,$$

where a, b and c are the portions of triangle area built from P point to triangle edges.

The triangle area is normalized by default, so the value is one. It means that the sum of all areas gives one.

$$1 = a + b + c.$$

The attribute calculation is linear only into eye space.

$$C = a'^{*}Ca + b'^{*}Cb + c'^{*}Cc,$$

where Ca, Cb and Cc are the attributes associated to vertices of triangle.

Each eye point is transformed into screen point by the matrix transform and then divided by w.

$$P = \frac{P' * M}{w} \quad (1)$$

where M is the fusion between model view and projection matrix and w is the homogeneous coordinate.

Applying the transformation on eye point P', it is possible to write:

$$P = \frac{P' * M}{w}$$
$$= \frac{(a' * P'a + b' * P'b + c' * P'c) * M}{w}$$
$$= \frac{a' * P'a * M}{w} + \frac{b' * P'b * M}{w} + \frac{c' * P'c * M}{w}.$$

For each triangle vertex the relation (1) is true, so the screen vertex points are the following:

$$Pa = \frac{P'a * M}{w_a} \quad Pb = \frac{P'b * M}{w_b} \quad Pc = \frac{P'c * M}{w_c}.$$

It is possible to replace them into previous formula:

$$P = \frac{P' * M}{w} = \frac{a' * Pa * w_a}{w} + \frac{b' * Pb * w_b}{w} + \frac{c' * Pc * w_c}{w}.$$

That equation must be equal to $P = a*Pa + b*Pb + c*Pc$.

The coefficients of Pa, Pb and Pc must be equal. Consequently, the screen areas are equivalent to eye areas in the following way:

$$a = \frac{a' * w_a}{w} \quad b = \frac{b' * w_b}{w} \quad c = \frac{c' * w_c}{w}. \quad (2)$$

It means that it is possible to find attributes with screen area instead of eye area:

$$C = \left( \frac{a * Ca}{w_a} + \frac{b * Cb}{w_b} + \frac{c * Cc}{w_c} \right) * w.$$

W is not yet known, but there is a relation between eye areas:

$$1 = a' + b' + c'.$$

Replacing in equation 2), it is possible to find w:

$$w = \frac{1}{\left( \dfrac{a}{w_a} + \dfrac{b}{w_b} + \dfrac{c}{w_c} \right)}. \quad (3)$$

Finally, it is possible to calculate attributes without eye coordinates:

$$C = \frac{\left( \dfrac{a * Ca}{w_a} + \dfrac{b * Cb}{w_b} + \dfrac{c * Cc}{w_c} \right)}{\left( \dfrac{a}{w_a} + \dfrac{b}{w_b} + \dfrac{c}{w_c} \right)}. \quad (4)$$

At the end it is possible to introduce the edge equation $$E = x(y_1 - y_0) - y(x_1 - x_0) - x_0(y_1 - y_0) - y_0(x_1 - x_0) = a_x + b_y + c.$$

Since it is known that the edge equation is exactly the double area of a triangle having two vertices defining the edge E and a point outside the edge as the third vertex, and since areas a, b, c are normalized, their values are the following:

$$a = \frac{Ebc}{(Ebc + Eab + Eac)};$$
$$b = \frac{Eac}{(Ebc + Eab + Eac)};$$
$$c = \frac{Eab}{(Ebc + Eab + Eac)}.$$

Hence it is possible to write the interpolation (4) with the edge equation:

$$C = \frac{\left( Ebc * w_b * w_c * Ca + Eac * w_a * w_c * Cb + Eab * w_a * w_b * Cc \right)}{(Ebc * w_b * w_c + Eac * w_a * w_c + Eab * w_a * w_b)}.$$

By expressing each edge equation E in function of the corresponding vertex coordinates, and taking into account that, in the perspective transformation, w=−z, the starting formula for attribute C is obtained.

The formula for Z coordinate is derivable from relation (3).

Therefore, it is possible to evaluate directly the attribute with any point, directly in the screen space[.

According to one embodiment, the previous formulae can be expressed in the form $$C = \frac{H_0 + H_1\Delta x + H_2\Delta y}{H_3 + H_4\Delta x + H_5\Delta y}$$

$$Z = \frac{Z_0 Z_1 Z_2}{H_3 + H_4\Delta x + H_5\Delta y}$$

where the coefficients $H_0$-$H_5$ are:

$H_0 = (\Delta X_{20}\Delta Y_{10} - \Delta Y_{20}\Delta X_{10})Z_1 Z_2 C_0$ $H_1 = -\Delta Y_{20}(Z_0 Z_2 C_1 - Z_1 Z_2 C_0) + \Delta Y_{10}(Z_0 Z_1 C_2 - Z_1 Z_2 C_0)$ $H_2 = \Delta X_{20}(Z_0 Z_2 C_1 - Z_1 Z_2 C_0) - \Delta X_{10}(Z_0 Z_1 C_2 - Z_1 Z_2 C_0)$ $H_3 = (\Delta X_{20}\Delta Y_{10} - \Delta Y_{20}\Delta X_{10})Z_1 Z_2$ $H_4 = \Delta Y_{20}(Z_0 Z_2 - Z_1 Z_2) + \Delta Y_{10}(Z_0 Z_1 - Z_1 Z_2)$ $H_5 = \Delta X_{20}(Z_0 Z_2 - Z_1 Z_2) - \Delta X_{10}(Z_0 Z_1 - Z_1 Z_2)$ The triangle set-up phase therefore computes 30 sums and 41 multiplications per primitive and per attribute. However it is possible to reduce the number of operations by introducing temporally variables:

$T_0 = Z_1 Z_2$ $T_1 = Z_0 Z_2$ $T_2 = Z_0 Z_1$ $T_3 = T_0 C_0$ $T_4 = T_1 C_1$ $T_5 = T_2 C_2$ $T_6 = T_1 - T_0$ $T_7 = T_2 - T_0$ $T_8 = T_4 - T_3$ $T_9 = T_5 - T_3$ $T_{10} = \Delta X_{20}\Delta Y_{10} - \Delta Y_{20}\Delta X_{10}$.

Therefore the H coefficients become:

$H_0 = T_{10} T_3$ $H_1 = -\Delta Y_{20} T_8 + \Delta Y_{10} T_9$ $H_2 = \Delta X_{20} T_8 - \Delta X_{10} T_9$ $H_3 = T_{10} T_0$ $H_4 = -\Delta Y_{20} T_6 + \Delta Y_{10} T_7$ $H_5 = \Delta X_{20} T_6 - \Delta X_{10} T_7$ Hence, the triangle set up computes 21 sums and 18 multiplications per primitive and per attribute.

Advantageously, the denominator is the same for any attributes, so one does not need to calculate more than the numerator for each attribute.

According to one embodiment, the attributes are R,G,B,A (color attributes), S,T,Q (texture attributes) and Fog. Z does not require more that the calculation of the numerator. The attributes are 8+Z coordinate. Therefore, triangle set up computes 84 sums and 68 multiplications per primitive.

Test Location Phase

According to one embodiment, to detect internal pixels of a primitive, the rasterizing module 507 uses techniques based on edge equation into screen space.

To verify if a point is inside or outside of a primitive, it is necessary to test the sign of the edge equation. For each couple of vertices, the equation of the line passing through the vertexes is calculated in the form of the following edge equation:

$E = x(y_1 - y_0) - y(x_1 - x_0) - x_0(y_1 - y_0) - y_0(x_1 - x_0) = ax + by + c$.

Any point on the line will satisfy this equation; points not belonging to the line and placed on one side will give a positive result, while points not belonging to the line and placed on the other side will give a negative result. Therefore, the edge equation can be used to determine on which side of a line a point is placed.

The three edge equations of a triangle will be:

$E_0 = x(y_1 - y_0) - y(x_1 - x_0) - x_0(y_1 - y_0) - y_0(x_1 - x_0) = a_{01}x + b_{01}y + c_{01}$ $E_1 = x(y_2 - y_0) - y(x_2 - x_0) - x_0(y_2 - y_0) - y_0(x_2 - x_0) = a_{02}x + b_{02}y + c_{02}$ $E_2 = x(y_1 - y_2) - y(x_1 - x_2) - x_2(y_1 - y_2) - y_2(x_1 - x_2) = a_{21}x + b_{21}y + C_{21}$.

The rasterizing module 507 then defines if an edge is left or right. According to one embodiment of the invention, for determining if an edge is left or right, the rasterizing module 507:

selects a reference edge between two vertexes;
tests the sign of the reference edge equation for the third vertex, and:
  if the sign is positive, marks the reference edge as a left edge;
  if the sign is negative, marks the reference edge as a right edge.

As an example, the rasterizing module 507 selects as reference edge the edge with the maximum $\Delta y$, i.e., the edge showing the maximum value of the difference between the y coordinates of the corresponding vertexes. In this case, the third vertex is a middle vertex, along the y axis.

As stated above, to verify if a point is inside or outside a primitive, the sign of the edge equation may be tested. The line equation could be $ax+by+c=0$ or $-ax-by-c=0$, so the sign of the edge equation depends on the sign of the coefficients. According to one embodiment, it is better to have always an internal point with a positive edge equation for all edges, so it is not necessary to change sign of edge equation every time. In other words, the coefficients sign of the edge equation of the left and right edges is chosen such that the results of the edge equations for a point falling between the left and right edges have the same sign.

Then it is sufficient to follow a clockwise direction to define the sign of coefficient.

With reference to FIGS. 7, 8, if $E_0$ is the reference edge and $V_2$ the middle vertex, if the corresponding edge equation evaluated for $V_2$ gives a positive result, $E_0(V_2)>0$, then the middle vertex is right and the sign of $a_{21}$, $b_{21}$, $c_{21}$ and $a_{02}$, $b_{02}$, $c_{02}$ may be changed to have an internal point with $E_0$, $E_1$, $E_2$ positive (FIG. 7).

If $E_0(V_2)<0$, then the middle vertex is left and the sign of $a_{01}$, $b_{01}$, $c_{01}$ may be changed to have an internal point with $E_0$, $E_1$, $E_2$ positive (FIG. 8).

A winding equation (cross product between two vectors) gives the same result as the edge equation, so they are equivalent.

It should be noted that, in a tile-based rendering system, for example in a sort-middle technique, many parameters used by the rasterizing module 507, for example the coefficients of the edge equations and the top and bottom values of a primitive, are already available to the rasterizing module 507 since they have already been calculated by the binner module 503 for constructing the bounding box around a primitive and detecting the tiles associated to the primitive. A tile-based rendering system is for example disclosed in U.S. patent application Ser. Nos. 11/838,762 and 11/951,186, incorporated herein by reference, in their entirety.

According to one approach, the rasterizing module 507 finds the border pixels of the primitive, calculates the attributes of the border pixels and then, for example by working per pixel rows or columns, incrementally calculates the attributes of each internal pixel.

According to one embodiment, the rasterizer module 507 splits a triangle in two parts, bottom and top triangles created by the middle vertex. In this way, the rasterizer module 507 works starting from left to right edge to render the pixel row, without changing edge and relative partial attribute derivates.

A method for finding the border pixels is for example described in the above cited U.S. application Ser. No. 11/951,186.

According to this approach, the above described operations in the set-up phase are not necessary for non-border pixels, while for the internal pixels it is possible to use a differential formula, moving in the same row or column by adjacent pixels.

For example, if an attribute $C=C_{num}/C_{den}$ ($C_{num}$ being the numerator of the C equation and $C_{den}$ being the denominator), moving by rows, that is maintaining y constant, we have that $$C_{numi+1}=C_{numi}+H_1 \text{ and } C_{deni+1}=C_{deni}+H_4$$

that is, 2 sums per attribute and 1 division per fragment.

Maintaining x constant (i.e., by moving by columns):

$$C_{numi+1}=C_{numi}+H_2$$

and $$C_{deni+1}=C_{deni}+H_5.$$

It is however possible to use the differential formula for any direction:

$$C_{numi+1}=C_{numi}+H_1\Delta x_i+H_2\Delta y_i$$

and $$C_{deni+1}=C_{deni}+H_4\Delta x_i+H_5\Delta y_i.$$

It should be noted that, in a tile-based rendering system, during tile association with a primitive, a point inside the triangle edge is generated as a starting point. This point could also be used as a good starting point for pixel rendering into screen space.

Parallelism

The possibility given by the rasterizing method of calculating the attributes of any point of the screen, without necessarily starting from a vertex, allows to apply in parallel the calculation of all pixel attributes.

For example, the bounding box around the primitive could be divided in a plurality of sub-rectangles which can be processed in parallel, for example by rows, by respective rasterizer modules 507.

According to one embodiment, it would be preferable to implement a rendering strategy to balance to load of N rasterizers. In fact, a row could be shorter than another, so a rasterizer could finish its work early and another one later. A good solution could be to give a new row to the first rasterizer that finishes its row. The new row should be the longest remained, so that when the last rasterizer finishes its row, it could start with a smaller one. In this way the N rasterizers should terminate their work almost at the same time.

For example, with reference to FIGS. 10*a*-10*d*, in a first step a first group of border pixels BP' are found, for example using the method disclosed in U.S. patent application Ser. No. 11/951,186.

In a second step, the found border pixels BP' are rendered in parallel with respective rasterizer modules, using the general formula for attribute C and Z coordinate. In the meantime, a second group of other border pixels BP''' are found.

In a third step, the internal pixels IP' on the same rows of the first border pixels BP' are rendered in parallel with respective rasterizer modules, using the differential formula with y constant. The rasterizers associated to the shortest rows, the upper ones $R_1$ and $R_2$ in the example, finish their rendering earlier than the rasterizer modules associated to longer rows $R_3$, $R_4$. Therefore, the first rasterizer modules can restart with the longest rows $R_5$, $R_6$. They will apply the general formula for the border pixels BP''' and then the differential formula for the internal pixels IP'''.

In a fourth step, the rasterizers associated to the longest rows $R_3$, $R_4$ finish their work. Therefore, these rasterizer modules can restart with the remaining rows $R_7$, $R_8$. They will apply the general formula for the border pixels BP''' and then the differential formula for the internal pixels IP'''.

At the end of rendering phase, some rasterizer modules may finish earlier because the number of row could be different. In that case, free rasterizers can help busy rasterizers to complete their row.

In any case, the rasterizing method does not require more than a minimum number of operations, and it offers the possibility to have a high parallelism and a flexible rendering direction. In particular, in the set-up phase, it does not need divisions by w-coordinate as RLI and Homogeneous techniques.

All the calculations are made into the screen space, so the method is much simpler than Homogeneous. It can start interpolation from any point of the screen space, so it does not need a scan line technique to find border pixel and, above all, it allows more than the rasterizer to work in parallel on the same primitive.

Moreover, the rendering direction is flexible, without adding extra calculations to switch direction. Therefore, according to the change in slope of the edges of a primitive, it is possible to freely change rendering direction.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A rasterizing method, comprising:
calculating, using a graphics processor, an attribute (C) of a pixel having coordinates (X, Y), based on coordinates $(X_0, Y_0)$, $(X_1, Y_1)$, $(X_2, Y_2)$ of vertices of a primitive in a screen space, Z coordinates $Z_0$, $Z_1$ and $Z_2$ of said vertices in a three-dimensional space, and attributes $C_0$, $C_1$, $C_2$ of said vertices, the calculating including:
defining a vertex $(X_0, Y_0)$ as reference,
finding H coefficients $$H_0 = (\Delta X_{20} \Delta Y_{10} - \Delta Y_{20} \Delta X_{10}) Z_1 Z_2 C_0$$

$$H_1 = -\Delta Y_{20}(Z_0 Z_2 C_1 - Z_1 Z_2 C_0) + \Delta Y_{10}(Z_0 Z_1 C_2 - Z_1 Z_2 C_0)$$

$$H_2 = \Delta X_{20}(Z_0 Z_2 C_1 - Z_1 Z_2 C_0) - \Delta X_{10}(Z_0 Z_1 C_2 - Z_1 Z_2 C_0)$$

$$H_3 = (\Delta X_{20} \Delta Y_{10} - \Delta Y_{20} \Delta X_{10}) Z_1 Z_2$$

$$H_4 = -\Delta Y_{20}(Z_0 Z_2 - Z_1 Z_2) + \Delta Y_{10}(Z_0 Z_1 - Z_1 Z_2)$$

$$H_5 = \Delta X_{20}(Z_0 Z_2 - Z_1 Z_2) - \Delta X_{10}(Z_0 Z_1 - Z_1 Z_2)$$

using the graphics processor, wherein $\Delta X_{ij} = X_i - X_j$ and $\Delta Y_{ij} = Y_i - Y_j$,
calculating attribute C using the formula:

$$C = \frac{H_0 + H_1 \Delta x + H_2 \Delta y}{H_3 + H_4 \Delta x + H_5 \Delta y}$$

wherein $\Delta x = X - X_0$ and $\Delta y = Y - Y_0$.

2. The method according to claim 1, wherein the attribute C is one of color attributes (R, G, B, A), texture attributes (S, T, Q) and Fog.

3. The method according to claim 2, further comprising calculating a Z coordinate of pixel (X, Y), using the formula:

$$Z = \frac{Z_0 Z_1 Z_2}{H_3 + H_4 \Delta x + H_5 \Delta y}.$$

4. The method according to claim 1, comprising a set-up phase in which the coefficients $H_0$-$H_5$ are calculated only once for all pixels associated with a primitive.

5. The method according to claim 1, further comprising, before calculating attribute C of the pixel, testing if the pixel is inside a primitive.

6. The method according to claim 1, comprising:
a set-up phase, in which the coefficients $H_0$-$H_5$ are calculated,
a test location phase, in which pixels associated with a primitive are detected, and
an attributes interpolation phase, in which the attributes of all the pixels detected are calculated.

7. The method according to claim 6, in which the test location phase uses a sign of an edge equation of edges of the primitive for detecting if a pixel is inside a primitive.

8. The method according to claim 6, in which the test location phase comprises a border pixels detection phase that detects pixels crossed by the edges of the primitive.

9. The method according to claim 8, comprising:
calculating the attribute C of border pixels of the primitive;
calculating the attribute C of internal pixels of the primitive using the following differential formula for any direction of exploration of the pixels:

$$C_{numi+1} = C_{numi} + H_1 \Delta x_i + H_2 \Delta y_i$$

and $$C_{deni+1} = C_{deni} + H_4 \Delta x_i + H_5 \Delta y_i,$$

where $C_{numi}$ is the numerator of the C formula for a pixel with a coordinate i and $C_{deni}$ is the denominator of the C formula for the pixel with coordinate i.

10. The method according to claim 8, comprising:
calculating the attribute C of border pixels of the primitive;
calculating the attribute C of internal pixels of the primitive using the following differential formulae by moving in the same row or column by adjacent pixels $$C_{numi+1} = C_{numi} + H_1$$

and $$C_{deni+1} = C_{deni} + H_4,$$

for y constant, or $$C_{numi+1} = C_{numi} + H_2$$

and $$C_{deni+1} = C_{deni} + H_5,$$

for x constant, where $C_{numi}$ is the numerator of the C formula for a pixel with a coordinate i and $C_{deni}$ is the denominator of the C formula for the pixel with coordinate i.

11. The method according to claim 1, comprising calculating in parallel of the attributes C of pixels of different portions of the primitive.

12. A rasterizer module, comprising:
a calculating module configured to calculate an attribute (C) of a pixel having coordinates (X, Y), based on coordinates $(X_0, Y_0)$, $(X_1, Y_1)$, $(X_2, Y_2)$ of vertices of a primitive in a screen space, Z coordinates $Z_0$, $Z_1$ and $Z_2$ of said vertices into three-dimensional space, and attributes $C_0$, $C_1$, $C_2$ of said vertices, the calculating module being of a processor and including:
a first calculating module configured to calculate a distance $(\Delta x, \Delta y)$ between the coordinates (X, Y) of the pixel and coordinates of a reference vertex of a primitive; and
a second calculating module configured to calculate the attribute (C) with the formula:

$$C = \frac{(\Delta X_{20}\Delta Y_{10} - \Delta Y_{20}\Delta X_{10})Z_1 Z_2 C_0 + (\Delta y \Delta X_{20} - \Delta x \Delta Y_{20})(Z_0 Z_2 C_1 - Z_1 Z_2 C_0) + (\Delta x \Delta Y_{10} - \Delta y \Delta X_{10})(Z_0 Z_1 C_2 - Z_1 Z_2 C_0)}{(\Delta X_{20}\Delta Y_{10} - \Delta Y_{20}\Delta X_{10})Z_1 Z_2 + (\Delta y \Delta X_{20} - \Delta x \Delta Y_{20})(Z_0 Z_2 - Z_1 Z_2) + (\Delta x \Delta Y_{10} - \Delta y \Delta X_{10})(Z_0 Z_1 - Z_1 Z_2)}.$$

13. The rasterizer module according to claim 12, wherein the second calculating module is configured to calculate H coefficients:

$$H_0 = (\Delta X_{20} \Delta Y_{10} - \Delta Y_{20} \Delta X_{10}) Z_1 Z_2 C_0$$

$$H_1 = -\Delta Y_{20}(Z_0 Z_2 C_1 - Z_1 Z_2 C_0) + \Delta Y_{10}(Z_0 Z_1 C_2 - Z_1 Z_2 C_0)$$

$$H_2 = \Delta X_{20}(Z_0 Z_2 C_1 - Z_1 Z_2 C_0) - \Delta X_{10}(Z_0 Z_1 C_2 - Z_1 Z_2 C_0)$$

$$H_3 = (\Delta X_{20} \Delta Y_{10} - \Delta Y_{20} \Delta X_{10}) Z_1 Z_2$$

$$H_4 = -\Delta Y_{20}(Z_0 Z_2 - Z_1 Z_2) + \Delta Y_{10}(Z_0 Z_1 - Z_1 Z_2)$$

$$H_5 = \Delta X_{20}(Z_0 Z_2 - Z_1 Z_2) - \Delta X_{10}(Z_0 Z_1 - Z_1 Z_2)$$

and calculate attribute (C) as:

$$C = \frac{H_0 + H_1 \Delta x + H_2 \Delta y}{H_3 + H_4 \Delta x + H_5 \Delta y}.$$

14. The rasterizer module according to claim 12, wherein the calculating module is configured to calculate the Z coordinate of the pixel (X, Y) with the formula:

$$Z = \frac{Z_0 Z_1 Z_2}{(\Delta X_{20} \Delta Y_{10} - \Delta Y_{20} \Delta X_{10}) Z_1 Z_2 + (\Delta y \Delta X_{20} - \Delta x \Delta Y_{20})}.$$
$$(Z_0 Z_2 - Z_1 Z_2) + (\Delta x \Delta Y_{10} - \Delta y \Delta X_{10})(Z_0 Z_1 - Z_1 Z_2)$$

15. The rasterizer module according to claim 12, further comprising a detector configured to detect if the pixel is inside the primitive.

16. The rasterizer module according to claim 12, comprising:

a border pixel detector configured to detect pixels crossed by an edge of the primitive, wherein the second calculating module is configured to:

calculate the attribute C of the border pixels of the primitive; and calculate the attribute C of the internal pixels of the primitive with the formulae:

$$C_{numi+1} = C_{numi} + H_1 \Delta x_i + H_2 \Delta y_i$$

and $$C_{deni+1} = C_{deni} + H_4 \Delta x_i + H_5 \Delta y_i,$$

where $C_{numi}$ is the numerator of the C formula for a pixel with a coordinate i and $C_{deni}$ is the denominator of the C formula for the pixel with coordinate i.

17. A graphic processor, comprising:

a geometry stage structured to process a primitive representing a model of an object to be displayed on a screen; and a rasterizer module arranged downstream of said geometry stage and suitable for acquiring from the geometry stage primitive coordinates and associating the primitive coordinates to pixels of the screen, the rasterizer module including:

a calculating module configured to calculate an attribute (C) of a pixel having coordinates (X, Y), based on coordinates $(X_0, Y_0)$, $(X_1, Y_1)$, $(X_2, Y_2)$ of the vertices of the primitive in a screen space, Z coordinates $Z_0$, $Z_1$ and $Z_2$ of said vertices into the three-dimensional space, and attributes $C_0$, $C_1$, $C_2$ of said vertices, the calculating module being of a processor including:

a first calculating module configured to calculate a distance between the coordinates (X, Y) of the pixel and the coordinates of a reference vertex of a primitive;

a second module is configured to calculate the attribute (C) with the formula:

$$C = \frac{(\Delta X_{20} \Delta Y_{10} - \Delta Y_{20} \Delta X_{10}) Z_1 Z_2 C_0 + (\Delta y \Delta X_{20} - \Delta x \Delta Y_{20})}{(\Delta X_{20} \Delta Y_{10} - \Delta Y_{20} \Delta X_{10}) Z_1 Z_2 + (\Delta y \Delta X_{20} - \Delta x \Delta Y_{20})}.$$
$$\frac{(Z_0 Z_2 C_1 - Z_1 Z_2 C_0) + (\Delta x \Delta Y_{10} - \Delta y \Delta X_{10})(Z_0 Z_1 C_2 - Z_1 Z_2 C_0)}{(Z_0 Z_2 - Z_1 Z_2) + (\Delta x \Delta Y_{10} - \Delta y \Delta X_{10})(Z_0 Z_1 - Z_1 Z_2)}$$

18. The graphic processor according to claim 17, wherein the second calculating module is configured to calculate H coefficients:

$$H_0 = (\Delta X_{20} \Delta Y_{10} - \Delta Y_{20} \Delta X_{10}) Z_1 Z_2 C_0$$

$$H_1 = -\Delta Y_{20}(Z_0 Z_2 C_1 - Z_1 Z_2 C_0) + \Delta Y_{10}(Z_0 Z_1 C_2 - Z_1 Z_2 C_0)$$

$$H_2 = \Delta X_{20}(Z_0 Z_2 C_1 - Z_1 Z_2 C_0) - \Delta X_{10}(Z_0 Z_1 C_2 - Z_1 Z_2 C_0)$$

$$H_3 = (\Delta X_{20} \Delta Y_{10} - \Delta Y_{20} \Delta X_{10}) Z_1 Z_2$$

$$H_4 = -\Delta Y_{20}(Z_0 Z_2 - Z_1 Z_2) + \Delta Y_{10}(Z_0 Z_1 - Z_1 Z_2)$$

$$H_5 = \Delta X_{20}(Z_0 Z_2 - Z_1 Z_2) - \Delta X_{10}(Z_0 Z_1 - Z_1 Z_2)$$

and calculate attribute (C) as:

$$C = \frac{H_0 + H_1 \Delta x + H_2 \Delta y}{H_3 + H_4 \Delta x + H_5 \Delta y}.$$

19. The graphic processor according to claim 17, wherein the calculating module is configured to calculate the Z coordinate of the pixel (X, Y) with the formula:

$$Z = \frac{Z_0 Z_1 Z_2}{(\Delta X_{20} \Delta Y_{10} - \Delta Y_{20} \Delta X_{10}) Z_1 Z_2 + (\Delta y \Delta X_{20} - \Delta x \Delta Y_{20})}.$$
$$(Z_0 Z_2 - Z_1 Z_2) + (\Delta x \Delta Y_{10} - \Delta y \Delta X_{10})(Z_0 Z_1 - Z_1 Z_2)$$

20. The graphic processor according to claim 17, further comprising a detector configured to detect if the pixel is inside the primitive.

21. The graphic processor according to claim 17, comprising:

a border pixel detector configured to detect pixels crossed by an edge of the primitive, wherein the second calculating module is configured to calculate:

the attribute C of the border pixels of the primitive; and the attribute C of the internal pixels of the primitive with the formulae:

$$C_{numi+1} = C_{numi} + H_1 \Delta x_i + H_2 \Delta y_i$$

and $$C_{deni+1} = C_{deni} + H_4 \Delta x_i + H_5 \Delta y_i,$$

where $C_{numi}$ is the numerator of the C formula for a pixel with a coordinate i and $C_{deni}$ is the denominator of the C formula for the pixel with coordinate i.

22. A system, comprising:

a display screen; and a graphic module that includes:

a geometry stage structured to process a primitive representing a model of an object to be displayed on the screen; and a rasterizer module arranged downstream of said geometry stage and suitable for acquiring from the geometry stage primitive coordinates and associating the primitive coordinates to pixels of the screen, the rasterizer module including:

a calculating module configured to calculate an attribute (C) of a pixel having coordinates (X, Y), based on coordinates $(X_0, Y_0)$, $(X_1, Y_1)$, $(X_2, Y_2)$ of the vertices of a primitive in a screen space, Z coordinates $Z_0$, $Z_1$ and $Z_2$ of said vertices into the three-dimensional space, and attributes $C_0$, $C_1$, $C_2$ of said vertices, the calculating module including:

a first calculating module configured to calculate a distance $(\Delta x, \Delta y)$ between the coordinates (X, Y) of the pixel and the coordinates of a reference vertex of a primitive; and a second calculating module is configured to calculate the attribute (C) with the formula:

$$C = \frac{(\Delta X_{20}\Delta Y_{10} - \Delta Y_{20}\Delta X_{10})Z_1Z_2C_0 + (\Delta y\Delta X_{20} - \Delta x\Delta Y_{20})}{(\Delta X_{20}\Delta Y_{10} - \Delta Y_{20}\Delta X_{10})Z_1Z_2 + (\Delta y\Delta X_{20} - \Delta x\Delta Y_{20})}.$$
$$\phantom{C=}\frac{(Z_0Z_2C_1 - Z_1Z_2C_0) + (\Delta x\Delta Y_{10} - \Delta y\Delta X_{10})(Z_0Z_1C_2 - Z_1Z_2C_0)}{(Z_0Z_2 - Z_1Z_2) + (\Delta x\Delta Y_{10} - \Delta y\Delta X_{10})(Z_0Z_1 - Z_1Z_2)}$$

23. The system according to claim 22, wherein the second calculating module is configured to calculate H coefficients:

$H_0 = (\Delta X_{20}\Delta Y_{10} - \Delta Y_{20}\Delta X_{10})Z_1Z_2C_0$ $H_1 = -\Delta Y_{20}(Z_0Z_2C_1 - Z_1Z_2C_0) + \Delta Y_{10}(Z_0Z_1C_2 - Z_1Z_2C_0)$ $H_2 = \Delta X_{20}(Z_0Z_2C_1 - Z_1Z_2C_0) - \Delta X_{10}(Z_0Z_1C_2 - Z_1Z_2C_0)$ $H_3 = (\Delta X_{20}\Delta Y_{10} - \Delta Y_{20}\Delta X_{10})Z_1Z_2$ $H_4 = -\Delta Y_{20}(Z_0Z_2 - Z_1Z_2) + \Delta Y_{10}(Z_0Z_1 - Z_1Z_2)$ $H_5 = \Delta X_{20}(Z_0Z_2 - Z_1Z_2) - \Delta X_{10}(Z_0Z_1 - Z_1Z_2)$ and attribute (C) as:

$$C = \frac{H_0 + H_1\Delta x + H_2\Delta y}{H_3 + H_4\Delta x + H_5\Delta y}.$$

24. The system according to claim 22, wherein the calculating module is configured to calculate the Z coordinate of the pixel (X, Y) with the formula:

$$Z = \frac{Z_0Z_1Z_2}{(\Delta X_{20}\Delta Y_{10} - \Delta Y_{20}\Delta X_{10})Z_1Z_2 + (\Delta y\Delta X_{20} - \Delta x\Delta Y_{20})}.$$
$$\phantom{Z=}\overline{(Z_0Z_2 - Z_1Z_2) + (\Delta x\Delta Y_{10} - \Delta y\Delta X_{10})(Z_0Z_1 - Z_1Z_2)}$$

25. The system according to claim 22, further comprising a detector configured to detect if the pixel is inside the primitive.

26. The system according to claim 22, comprising:

a border pixel detector configured to detect pixels crossed by an edge of the primitive, wherein the second calculating module is configured to calculate:

the attribute C of the border pixels of the primitive; and the attribute C of the internal pixels of the primitive with the formulae:

$C_{numi+1} = C_{numi} + H_1\Delta x_i + H_2\Delta y_i$ and $C_{deni+1} = C_{deni} + H_4\Delta x_i + H_5\Delta y_i$, where $C_{numi}$ is the numerator of the C formula for a pixel with a coordinate i and $C_{deni}$ is the denominator of the C formula for the pixel with coordinate i.

* * * * *